(12) United States Patent
Westin et al.

(10) Patent No.: US 9,975,605 B2
(45) Date of Patent: May 22, 2018

(54) DECKING

(71) Applicant: Kebony ASA, Porsgrunn OT (NO)

(72) Inventors: Mats Westin, Boras (SE); Stig Lande, Sarpsborg (NO); Per Brynildsen, Porsgrunn (NO)

(73) Assignee: Kebony ASA, Porsgrunn (NO)

( * ) Notice: Subject to any disclaimer, the term of this patent is extended or adjusted under 35 U.S.C. 154(b) by 0 days. days.

(21) Appl. No.: 14/995,165

(22) Filed: Jan. 13, 2016

(65) Prior Publication Data

US 2016/0129971 A1    May 12, 2016

Related U.S. Application Data

(63) Continuation of application No. 13/264,663, filed as application No. PCT/EP2010/055467 on Apr. 23, 2010, now abandoned.

(30) Foreign Application Priority Data

Apr. 23, 2009 (GB) .................................. 09069899.9

(51) Int. Cl.
*B63B 5/10* (2006.01)
*B32B 3/14* (2006.01)
(Continued)

(52) U.S. Cl.
CPC .................. *B63B 5/10* (2013.01); *B32B 3/14* (2013.01); *B32B 7/12* (2013.01); *B32B 15/10* (2013.01);
(Continued)

(58) Field of Classification Search
CPC ...... C08L 71/14; C08L 97/02; C08L 2666/02; C08L 61/24; C08L 81/02; B63B 5/10;
(Continued)

(56) References Cited

U.S. PATENT DOCUMENTS 2,313,953 A   3/1943   Loughborough et al.
2,909,450 A   10/1959  Goldstein et al.
(Continued)

FOREIGN PATENT DOCUMENTS

CN   1469798   1/2004
CN   1671526   9/2005
(Continued)

OTHER PUBLICATIONS

Green, et al., "Mechanical Properties of Wood,".
(Continued)

*Primary Examiner* — Camie S Thompson
(74) *Attorney, Agent, or Firm* — Workman Nydegger (57) ABSTRACT

Decking comprises: a support selected from the group consisting of: polymeric materials; marine engineering polymers, fiber reinforced polymers, polymer metal composites, metal or wood sheets or marine superstructure; an array of strips of polymer treated wood secured to the support by means of an adhesive; the adhesive being selected from the group consisting of: polyurethane adhesives, modified silyl polymer adhesives and epoxy resin adhesives; wherein the polymer treated wood comprises a wood species selected from the group consisting of: maple species impregnated with a wood compatible polymerizable monomer, preferably selected from furfuryl alcohol, bis hydroxymethyl furan and mixtures thereof and subsequently dried and cured.

20 Claims, 6 Drawing Sheets (51) Int. Cl.

| | | |
|---|---|---|
| B32B 37/10 | (2006.01) | |
| B32B 21/08 | (2006.01) | |
| B32B 37/12 | (2006.01) | |
| B32B 38/08 | (2006.01) | |
| C08L 97/02 | (2006.01) | |
| B32B 7/12 | (2006.01) | |
| B32B 15/10 | (2006.01) | |
| B32B 15/18 | (2006.01) | |
| B32B 15/20 | (2006.01) | |
| B32B 21/04 | (2006.01) | |
| B32B 21/10 | (2006.01) | |
| B32B 27/18 | (2006.01) | |
| B32B 27/34 | (2006.01) | |
| B32B 27/36 | (2006.01) | |
| B32B 27/40 | (2006.01) | |
| C09J 5/00 | (2006.01) | |
| B27K 3/15 | (2006.01) | |
| B27K 5/04 | (2006.01) | |
| B32B 38/16 | (2006.01) | |
| C08L 71/14 | (2006.01) | |

(52) U.S. Cl.
CPC .............. *B32B 15/18* (2013.01); *B32B 15/20* (2013.01); *B32B 21/042* (2013.01); *B32B 21/08* (2013.01); *B32B 21/10* (2013.01); *B32B 27/18* (2013.01); *B32B 27/34* (2013.01); *B32B 27/36* (2013.01); *B32B 27/40* (2013.01); *B32B 37/10* (2013.01); *B32B 37/12* (2013.01); *B32B 38/08* (2013.01); *C08L 97/02* (2013.01); *C09J 5/00* (2013.01); *B27K 3/156* (2013.01); *B27K 5/04* (2013.01); *B32B 2038/166* (2013.01); *B32B 2260/026* (2013.01); *B32B 2260/046* (2013.01); *B32B 2262/0269* (2013.01); *B32B 2262/101* (2013.01); *B32B 2262/106* (2013.01); *B32B 2307/51* (2013.01); *B32B 2307/536* (2013.01); *B32B 2307/542* (2013.01); *B32B 2307/546* (2013.01); *B32B 2307/554* (2013.01); *B32B 2307/72* (2013.01); *B32B 2307/744* (2013.01); *B32B 2317/16* (2013.01); *B32B 2605/12* (2013.01); *C08L 71/14* (2013.01); *C09J 2463/00* (2013.01); *C09J 2475/00* (2013.01); *C09J 2483/00* (2013.01); *C09J 2497/008* (2013.01); *Y10T 428/249925* (2015.04)

(58) Field of Classification Search
CPC .. B63B 3/48; B63B 5/06; B32B 15/10; B32B 2038/166; B32B 2260/026; B32B 2307/536; B32B 2307/72; B32B 2605/12; B32B 27/18; B32B 37/10; B32B 28/08; B32B 7/12; B32B 7/10; B32B 38/08; B32B 21/042; B32B 2317/16; B05D 3/02; B05D 3/10; B05D 3/108; B27K 5/0085; B27K 3/15; B27K 3/34; Y10T 428/249925; Y10T 428/662
USPC .............. 428/189, 292.4, 541; 156/329, 330
See application file for complete search history.

(56) References Cited

U.S. PATENT DOCUMENTS

| | | |
|---|---|---|
| 2,947,648 A | 8/1960 | Sonnabend et al. |
| 3,622,380 A | 11/1971 | Williams |
| 4,496,697 A | 1/1985 | Zsolnay et al. |
| 5,032,525 A | 7/1991 | Lee et al. |
| 5,512,098 A | 4/1996 | French et al. |
| 6,170,212 B1 | 1/2001 | Suchyna et al. |
| 6,318,794 B1 | 11/2001 | Berube |
| 7,578,251 B1 | 8/2009 | Gribble |
| 9,156,185 B2 | 10/2015 | Bendiksten et al. |
| 2003/0186035 A1 | 10/2003 | Cruce et al. |
| 2004/0028933 A1 | 2/2004 | Schneider |
| 2004/0091727 A1 | 5/2004 | Schneider |
| 2006/0154100 A1 | 7/2006 | Holcomb |
| 2006/0155049 A1 | 7/2006 | l'Abee et al. |
| 2008/0220277 A1 | 9/2008 | Kingma et al. |
| 2009/0197036 A1 | 8/2009 | Hwang et al. |
| 2012/0128962 A1 | 5/2012 | Westin et al. |

FOREIGN PATENT DOCUMENTS

| | | |
|---|---|---|
| EP | 1341648 | 8/2004 |
| EP | 1368167 | 10/2004 |
| GB | 1416428 | 2/1972 |
| GB | 20090006146 | 4/2010 |
| JP | 2007320199 | 12/2007 |
| WO | 8800114 | 1/1988 |
| WO | 2002030638 | 4/2002 |
| WO | 2002043933 | 6/2002 |
| WO | 2002060660 | 8/2002 |
| WO | 2004011214 | 5/2004 |
| WO | 2004011216 | 5/2004 |
| WO | 2010116262 | 10/2010 |
| WO | 2010122156 | 10/2010 |

OTHER PUBLICATIONS

International Search Report and Written Opinion from PCT/IB2010/000991 completed Sep. 24, 2010.
International Search Report from PCT/EP2010/055467 completed Sep. 20, 2010.
Militz H. "Treatment of Timber with Water Soluble Dimethylol Resins to Improve their Dimensional Stability and Durability" Wood Science and Technology, Springer Verlag, Berlin, DE LNKD-DOI-10.1007/U00192221, vol. 27, Jan. 1, 1993, pp. 347-355, XP009025114, ISSN: 0043-7719.
UK Search Report from Application No. GB0906146.6 completed May 27, 2009.
UK Search Report from Application No. GB0906989.9 completed Jul. 15, 2009.
Wan, et al., "Effect of Impregnation and In-Situ Polymerization of Methacrylates of Hardness of Sugar Maple Wood,".
Zhang, et al., "Water Vapor Adsorption and Volumetric Swelling of Melt-Impregnated Wood-Polymer Composites,".
U.S. Appl. No. 13/264,663, May 9, 2013, Office Action.
U.S. Appl. No. 13/264,663, Mar. 28, 2013, Restriction Requirement.
U.S. Appl. No. 13/264,663, Nov. 22, 2013, Final Office Action.
U.S. Appl. No. 13/263,710, May 9, 2014, Restriction Requirement.
U.S. Appl. No. 13/264,663, Sep. 11, 2014, Office Action.
U.S. Appl. No. 13/263,710, Oct. 24, 2014, Office Action.
U.S. Appl. No. 13/263,710, Apr. 28, 2015, Notice of Allowance.
U.S. Appl. No. 13/264,663, Aug. 13, 2015, Final Office Action.
U.S. Appl. No. 13/263,710, Sep. 10, 2015, Notice of Allowance.

DECKING

CROSS-REFERENCE TO RELATED APPLICATIONS

The present application is a continuation of U.S. patent application Ser. No. 13/264,663, entitled "Decking", filed Apr. 23, 2010, which claims priority to and the benefit of PCT Application Number PCT/EP2010/0554671 filed Apr. 23, 2010, which claims priority to GB patent application No 0906989.9 filed Apr. 23, 2009. All of the aforementioned applications are incorporated by reference herein in their entirety.

BACKGROUND OF THE INVENTION

1. The Field of the Invention

This invention relates to decking for boats or other marine vessels particularly but not exclusively for leisure boats.

Conventional decking for leisure boats comprises sheets of teak secured to a substrate by an adhesive. Teak decking is expensive and not favoured environmentally due to deforestation of natural timber resources. Other species of wood have inferior engineering properties. A problem with natural teak decking has been a limitation on the ability to withstand modern cleaning techniques, such as washing using high pressure water jets.

It is an object of the present invention to provide decking having superior engineering and maintenance properties particularly resistance to washing using high pressure water jets.

According to a first aspect of the present invention decking comprises:
- a support selected from the group consisting of: polymeric materials; marine engineering polymers, fibre reinforced polymers, polymer metal composites, metal or wood sheets or marine superstructure;
- an array of strips of polymer treated wood secured to the support by means of an adhesive;
- wherein the polymer treated wood comprises a wood species selected from the group consisting of: maple species impregnated with a wood compatible polymerisable monomer, preferably selected from furfuryl alcohol, bis hydroxymethyl furan and mixtures thereof and subsequently dried and cured.

Preferably the treated wood exhibits a hardness value of 3 to 8 on the Brinell scale. The hardness is important for wear resistance in use of the decking. Alternatively or in addition, the treated wood exhibits an average bending modulus of rupture (MOR) of between about 100 and about 130 MPa. Preferably the treated wood exhibits one of: an average bending modulus of rupture (MOR) of between about 100 and about 130 MPa or a hardness value of 3 to 8 on the Brinell scale.

The bending modulus of elasticity (MOE) may be between 10000 and 16000 MPa in comparison to typical values of 13400 MPa for teak and 8000 MPa for untreated maple. The preferred monomer is furfuryl alcohol.

The average bending modulus of rupture (MOR) is preferably between about 120 to about 130 MPa.

Alternatively or in addition to the MOR value, the wood strips exhibit a hardness value from about 3 to about 8, preferably from about 4 to about 7, more preferably from about 5 to about 6 on the Brinell scale.

The hardness of natural teak is about 3.5 and the MOR of teak is about 148 MPa.

The adhesive is preferably being selected from the group consisting of: polyurethane adhesives, modified silyl polymer adhesives, epoxy resin adhesive, silicone adhesives and other adhesives developed for use in exterior marine constructions.

The support of the decking of this invention may comprise a substrate layer or sheet of polymeric or other material. The substrate may be selected from: polyester sheeting, glassfibre, reinforced polyester, epoxy-wood composites, plywood, polyaramid (Kevlar) sheet, carbonfibre composites or laminates, and solid wood or metal sheets, e.g. steel or aluminium. Alternatively the wood strips may be applied directly to a metal, or conventional wooden decking or otherwise to the superstructure of a boat.

Preferred species of wood is selected from the group consisting of the commercially used maple species including:

| | |
|---|---|
| Acer macrophyllum | Bigleaf maple |
| Acer negundo | Boxelder |
| Acer nigrum | Black maple |
| Acer rubrum | Red maple |
| Acer saccharinum | Silver maple |
| Acer saccharum | Sugar maple |
| Acer pseudoplatinus | Sycamore maple |
| Acer platanoides | Norway maple |
| Acer campestre | Field maple |

According to a second aspect of the present application a process for manufacture of decking comprises the steps of: assembling a laminate comprising an array of strips of wood secured to a support selected from the group consisting of a sheet of polymeric material selected from the group consisting of marine engineering polymers, fibre reinforced polymers, polymer metal composites metal or wood sheets or superstructure by means of an adhesive selected from the group consisting of: polyurethane adhesives modified silyl polymer adhesives and epoxy resin adhesives; applying heat and pressure to the assembly and allowing the adhesive to cure.

In preferred embodiments edges of the strips of wood include rebates, a sealant material being deposited within the rebates to seal edges between adjacent strips. The sealant material serves to form a tight and flexible seal that allows some shrinking and swelling of the individual wood boards while maintaining the integrity of the deck. The sealant may also serve to improve the non-slip properties of the decking. The rebates may be L-shaped, triangular or rectangular to provide T-shaped, V-shaped or rectangular spaces between adjacent strips.

The support may comprise a polymer material, especially a material selected from polymers used for manufacture of marine engineering components, including polyurethanes, polyamides, polyalkenes and polyesters. Fibre reinforced polymers may be used or polymer metal composites. Metal or wooden sheets may be used as substrates. Alternatively, the decking may be applied directly to marine superstructures to form a decking surface thereon.

Decking in accordance with this invention exhibits numerous advantages. Use of teak is avoided. Maple is cheaper and may be cultivated without depleting natural resources. The engineering properties of decking in accordance with this invention are superior to those of decking manufactured from teak. Surprisingly the visual appearance of decking in accordance with this invention resembles the appearance of natural teak. Furthermore the present inventors were surprised to discover that the appearance of the decking after weathering resembles the appearance of weathered natural teak. The timber surface is brown when new, turning grey on exposure to moisture and UV radiation, providing a similar appearance to weathered teak.

Decking in accordance with this invention may be cleaned using high pressure jet washing apparatus. This allows a jet washer to be used to clean the decking as well as metallic or polymeric parts of a boat. The need for a separate cleaning regime is avoided. Teak decking may be liable to delaminate when repeatedly exposed to a jet washer. Despite the use of maple, decking in accordance with this invention can be handled by boat builders in the same way as teak decking. Indeed the decking of this invention may be more resistant to the conditions encountered during transportation storage and manufacture. Decking in accordance with this invention has better hardness and wear resistance properties than natural teak giving a longer working lifetime.

Decking in accordance with this invention may exhibit a volumetric swelling of 8 to 10% from oven dried to moisture saturated, comparable to a value for teak (*Tectonia grandis*) of 9%. Untreated samples of maple have a swelling of about 16%.

The density of the impregnated timber composite may be between about 700 and about 1000 $kgm^{-3}$ in comparison to 630 $kgm^{-3}$ for teak.

Decking in accordance with this invention may be glued, caulked and surface treated using methods of materials conventionally used in the boat decking manufacture industries. The invention therefore provides a higher performance decking without the need for use of specialist high performance adhesives, hardwoods or specialist methods of manufacture.

The superior engineering properties and resistance to delamination provides a longer lifetime with slower wear and thinning in use. Also the invention may allow use of thinner timber than in manufacture of conventional decking. Less adhesive may be required. The strips may be selected and cut to display an attractive grain of the maple. The superior strength and resistance to delamination allows timber to be cut to optimally display graining without need to control the angle of the grain relative to the working surface of the decking.

Without risking to be bound by theory, it is believed that the bonding of the adhesive to the furan polymer impregnated within the cellular wood structure is superior to the bonding of the adhesive to the cellulose of untreated timber, particularly hardwoods having dense cellular structures or containing lipid components.

2. The Relevant Technology

The polymer treated timber of the present invention may be manufactured as disclosed in EP1341648, EP1368167, WO2004/011216, WO2004/011214, the disclosures of which specifications are incorporated into the present specification for all purposes by reference.

BRIEF SUMMARY OF THE INVENTION

In preferred embodiments the wood is impregnated with a polymerisable composition comprising furfuryl alcohol, a catalyst, a solvent selected from the group consisting of: water, $C_1$-$C_4$ alcohols and mixtures thereof; and optionally one or more stabilisers or other ingredients.

Impregnation may be performed using solutions where the concentration of monomer or oligomer range from 20 to 95%.

Impregnation with a solution comprising 30 to 100 parts of furfuryl alcohol to 100 parts by volume of water is preferred, especially 70 parts furfuryl alcohol to 100 parts of water. Such a composition exhibits superior fungal decay resistance.

A preferred process for manufacture of wooden decking strips comprises the steps of:

impregnating pieces of wood of a maple species with a polymerisable composition comprising:
(i) one or more wood compatible polymerisable monomers, oligomers or mixture thereof;
(ii) a catalyst and;
(iii) a solvent selected from the group consisting of: water, $C_1$-$C_4$ alcohols and mixtures thereof; and
(iv) optionally one or more pH stabilisers or other additives; to produce impregnated pieces of wood;

subjecting the impregnated pieces of wood to a water removal process comprising maintaining the pieces in an atmosphere having a pressure of about 0.1 to about 0.5 bar, a temperature of about 50 to about 90° C., for a duration sufficient to cause removal of water from the wood; and maintaining the wood at a higher temperature to form the polymeric material to produce polymer treated wooden decking strips or wood suitable for machining into decking strips.

The treated pieces may be suitably dimensioned for use directly as decking strips or may be machined to dimensions suitable for use as decking strips.

A vacuum is preferably applied to the wood before drying and curing to remove air. This serves to reduce the risk of an explosion.

The wood compatible polymerisable monomer or oligomer may be selected from furfuryl alcohol (FA), bishydroxymethyl furan (BHMF), trihydroxymethyl furan (THMF), oligomers of FA, BHMF and THMF, condensation products of these compounds and mixtures thereof. Further monomers or oligomers may include 2,5-furan dicarboxylic acid (FBCA) and succinic acid (SA).

Preferred monomers are derived from biomass or are derived from renewable and sustainable resources and are capable of impregnating a wood or a wooden article. A single monomer may be most convenient for simplicity and ease of uniform impregnation. Use of furfuryl alcohol or bishydroxymethyl furan is preferred.

The catalyst may be selected from the group consisting of: acids, for example, maleic anhydride, phthalic anhydride, maleic acid, malic acid, phthalic acid, benzoic acid, citric acid, zinc chloride, aluminium chloride, other cyclic organic anhydrides or latent catalysts such as ammonium salts organic anhydrides and mixtures thereof.

The stabilisers which preferably act as buffers may be selected from the group consisting of: carbonates, bicarbonates, citrates, phosphates and calcium or ammonium salts of lignosulphonic acids.

Optional further compounds may include borates, for example borax, disodium tetraborate, and boric acid.

After impregnation the wooden pieces are subjected to drying and curing processes. During drying, the relative humidity is preferably maintained at 80-100%, more preferably at about 90%, for a period of 1 to 200 hours, usually 3-5 days, followed by curing at a temperature preferably 50-180° C., more preferably 90-140° C., most preferably 100-130° C., especially about 120° C.

A heat exchanger or heat battery may be provided to allow direct heating of the atmosphere within the vessel.

Further heating may be preferably provided by injecting steam into the vessel. Steam is preferred to control the extent of drying of the wood.

Relative humidity within the chamber generally decreases during the drying process as water is removed from the chamber.

Preferably the relative humidity is maintained above a minimum level during the heating up phase and at the end of the drying process in order to minimise deformation and cracking of the wood. The relative humidity may range from about 30 to about 100%. A preferred minimum relative humidity is about 35% more preferably about 40% dependent on the wood species and the dimension of the wooden pieces or articles being processed.

The relative humidity within the container may be controlled by regulation of pressure and temperature.

Following the drying step the wooden specimens are heated to a higher temperature to cure the polymer. It is beneficial to remove water from the wood before curing. This allows more rapid curing since thermal energy is not lost by evaporation. A lower drying temperature may be used in comparison to a conventional process. Also heating of the wood to the curing temperature may be achieved in less time and with less energy due to the reduction of evaporative losses.

The drying and curing steps may be carried out in the same container, or vessel that is without a need for unloading from a drying oven and reloading into a separate curing oven.

During curing the pressure within the container may be maintained at about 1 bar and a relative humidity of 40-100%, preferably about 50-90%. Alternatively, a pressure greater than 1 bar may be used, for example, about 1 to about 4 bar.

In this specification percentages and other amounts are by weight unless indicated otherwise. Percentages and other proportions are selected from any ranges quoted to total 100%.

BRIEF DESCRIPTION OF THE DRAWINGS

The invention is further described by means of example but not in any limitative sense with reference to the accompanying drawings of which.

DETAILED DESCRIPTION OF THE PREFERRED EMBODIMENTS

Figure 1:
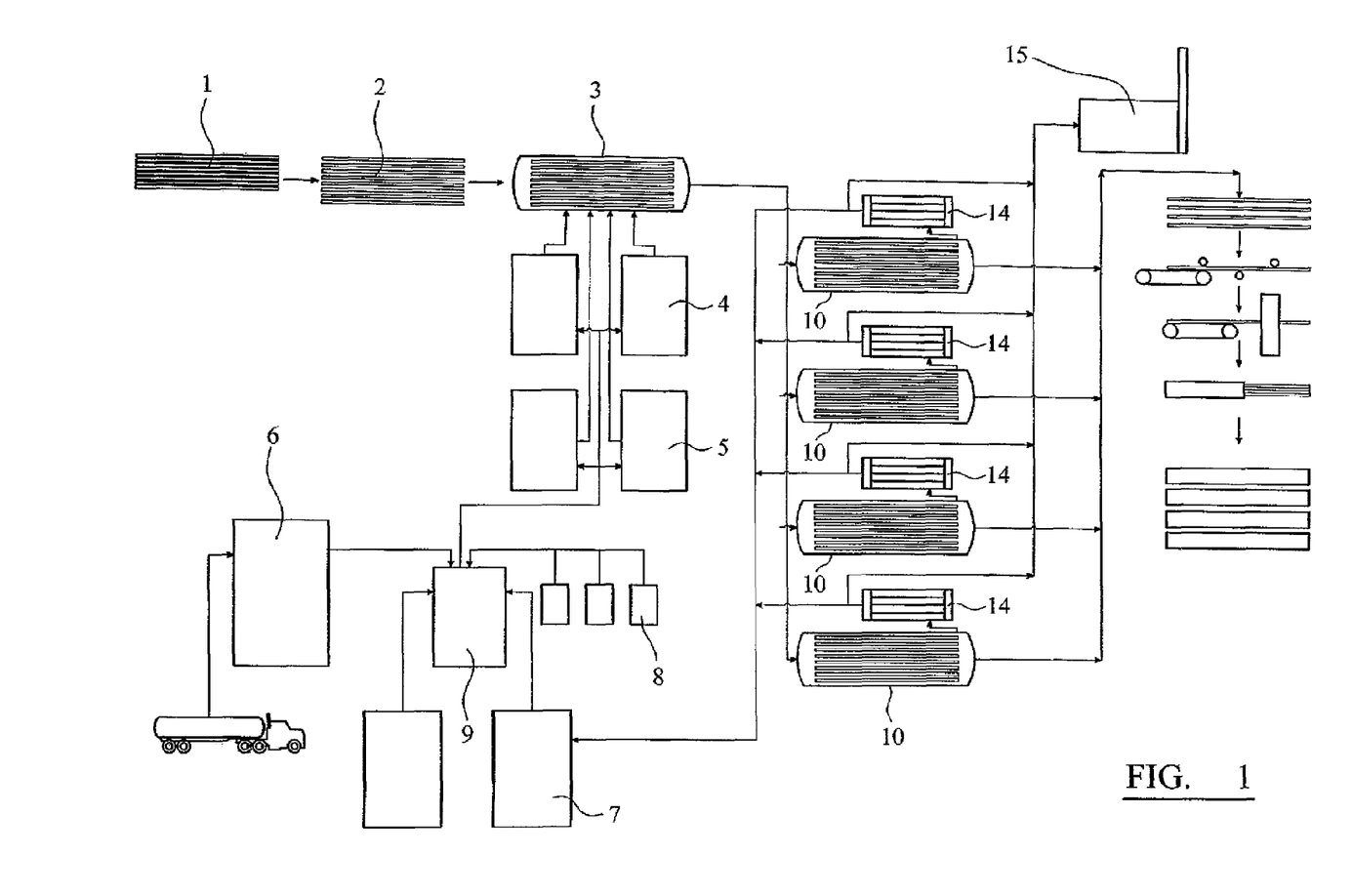
FIG. 1 is a schematic view of a timber impregnation plant in accordance with this invention.

FIG. 1 is a schematic view of a timber impregnation plant. A supply of wood or wooden articles, for example planks (1), is organised into a separated stack (2) on a trolley or other carrier (not shown) using spacers separating horizontal layers of boards, allowing gases and vapour to flow between the wood layers. The stack is then moved on the trolley into an impregnation autoclave (3).

The autoclave (3) is filled with an impregnating solution from buffer tanks (4,5) supplied from storage tanks (6,7,8) via a mixing and measuring tank (9).

After impregnation, the impregnated wood or wooden articles are transferred to a drying chamber (10). The drying chamber is provided with a heat exchanger, or inlet for steam and a condenser (14) connected to an outlet for recycling condensate collected from the condenser (14) to the storage tank (7). Gases from the condenser are routed through an air purifier (15).

After drying and curing the wood is sorted and stacked, machined if necessary, and packed for transportation and distribution.

The wood or wooden articles may be impregnated by any conventional technique including application of pressure up to 15 bar, vacuum followed by pressure or by application of atmospheric or low pressure followed by higher pressure and a final vacuum step.

The impregnating solution may comprise one or more monomers selected from furfuryl alcohol, bis hydroxymethyl furan, tris hydroxymethyl furan or oligomers of these compounds.

Mixtures of monomers or of monomers and oligomers may be used, provided that they are sufficiently fluid to penetrate and impregnate the wood.

A general method which may be used includes the steps of securing the wood so that it will not float; closing the autoclave and applying a partial vacuum; filling the autoclave with the treating mixture while maintaining the vacuum to submerge the wood; pressurizing the autoclave to a pressure in the range of 5-14 bar dependent on the wood species, dimensions of the wood or wooden articles and desired rate of impregnation. After impregnation the remaining liquid is removed and a final vacuum step is introduced for removal of excess liquid. Finally the treated wood is removed.

A typical treatment solution may comprise:

| | |
|---|---|
| furfuryl alcohol | 20 to 100 parts |
| water | 100 parts | with optional further ingredients.

A liquid uptake of 100% in relation to dry wood mass for maple sapwood may be achieved.

Alternative impregnating solutions are disclosed in WO2004/011216 and WO2004/011214 the disclosures of which are incorporated into this specification by reference for all purposes.

Figure 2:
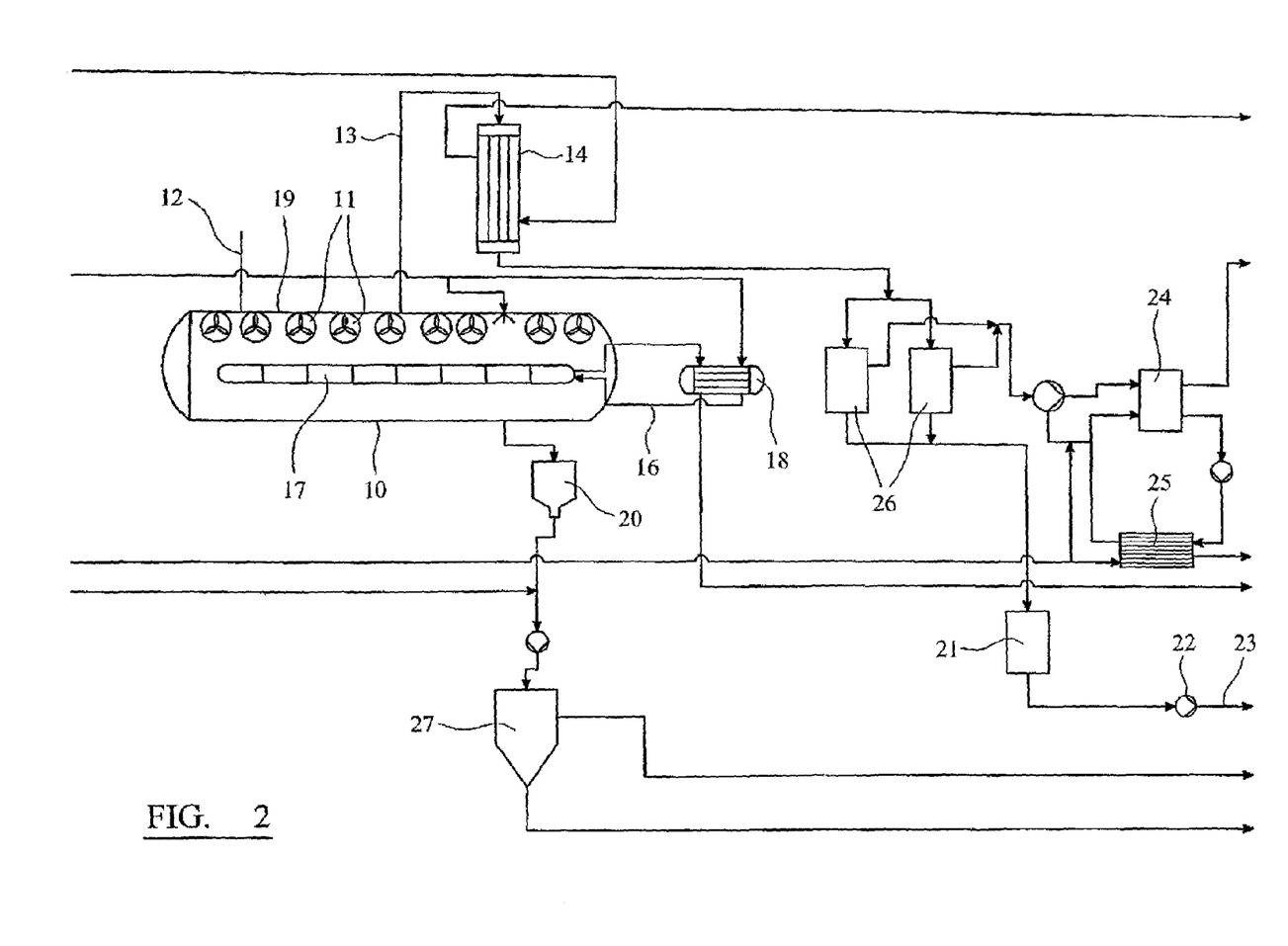
FIG. 2 illustrates the drying vessel of the plant.

FIG. 2 is a diagrammatic view of a drying chamber (10) shown in FIG. 1. The chamber (10) includes nine fans (11) and an air inlet valve (12). An outlet (13) for evaporated water communicates with a condenser (14). A steam inlet (16) delivers steam which optionally may be superheated steam from a boiler (not shown) to supply heating and humidity to the chamber (10). Heat exchangers (17) circulate hot water from a heat exchanger (18) supplied by the steam inlet (19). In this way, dry heat is provided to the chamber as necessary.

A condensate tank (20) serves to collect condensate from the bottom of the tank (10). The condensate is separated in separator (27).

Condensate from the condenser (14) is delivered to measuring tanks (26) for measuring the amount of condensed water vapour. A pump tank (21) delivers the measured condensate to a pump (22) indicated with a water outlet (23) to a condensate storage tank. A gas water separator (24) separates gas from the condensed water. The condensed water is cooled by a heat exchanger (25).

In use of the dryer, steam may be supplied directly to the tank (10) through inlets (16) and dry heat may be supplied by the heat exchangers (17) so that the temperature and humidity within the tank can be independently controlled.

When the impregnated wood or wood articles have been placed within the drying chamber, a pre-vacuum is applied for a short period to remove any air from the chamber in order to prevent a risk of fire or explosion. The pressure during the pre-vacuum period may be up to 0.3 bar due to evaporation of water from the impregnated wood.

The container is then heated to a temperature of about 70° C. over a period of 3-6 hours. During this heating up period the pressure may rise from the pre-vacuum pressure of less than 0.2 bar to between about 0.2 and about 0.4 bar, preferably about 0.3 bar.

This pressure may be maintained for up to 120 hours. During this period the temperature remains approximately constant while the relative humidity decreases. After this drying stage the pressure is allowed to increase to about 1 bar as the temperature is raised to between 100° C. and 110° C. These conditions are maintained until the curing is complete.

The relative humidity may be about 90%.

The conditions within the container are maintained by control of pressure, injection of steam and external heating.

The moisture content of the wood may be monitored by measurement of the amount of water collected from the container. The drying stage may be complete when the moisture content of the wood is about 15% or lower.

After the drying stage is complete the pressure is allowed to rise to about 1 bar and the temperature is increased to about 100 to 140° C. preferably about 100° C. to 120° C. with the relative humidity increasing to about 60 to 80% by addition of steam to the container, in order to prevent cracking or deformation of the wood.

The curing conditions may be maintained for about 6 to 24 hours dependent on the nature of the polymer composition and the thickness of the wood or wooden articles.

When the curing is complete the polymer impregnated wood or wooden articles may be removed from the container for machining, package and distribution.

The drying stage may last for about 120 hours. During this period the temperature is increased from 70° C. to 80° C. During this period the relative humidity decreases to below about 50% and the pressure to about 0.2 bar.

Impregnated timber produced as described above may be cut and machined into boards, lamellas, strips etc. for manufacture of decking.

Figure 3:
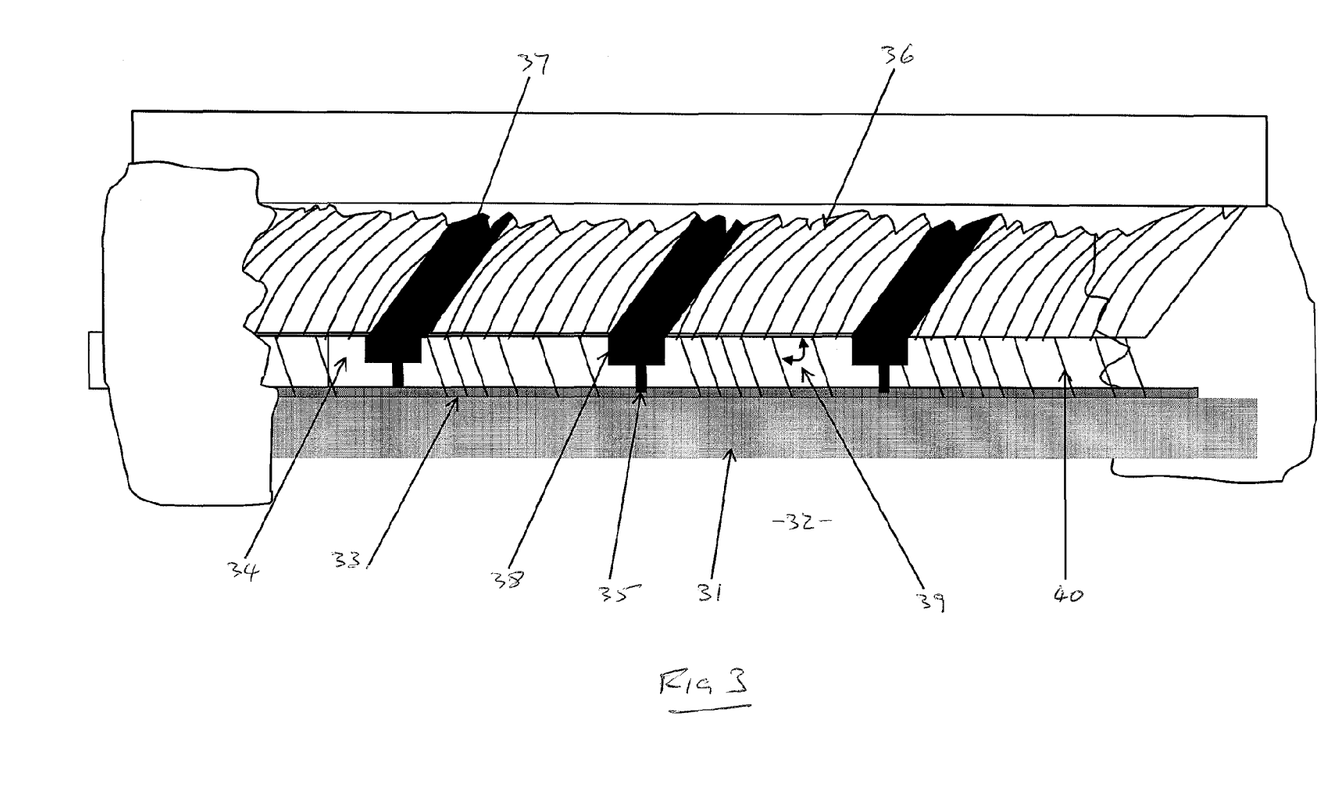
FIG. 3 illustrates decking in accordance with this invention.

FIG. 3 illustrates decking in accordance with this invention a substrate (31) composed of glass fibre reinforced polyester has a polyurethane adhesive (33) applied to the upper surface. Strips of polymer impregnated maple (34) are laid side by side upon the adhesive (33) and adhesive (35) is applied between adjacent strips to seal the gaps between the strips. A caulking adhesive (37) may be applied as a second step after completion of gluing of the planks to the support. The adhesive may be applied by vacuum gluing. After gluing, the planks may be sanded.

The strips may have various dimensions for example dimension of 45 by 600 mm and a thickness of 5 mm and are profiled with rebate (38) extending along the long edges to form a channel between adjacent strips to receive a caulking composition (37). Strips of a maximum available length are preferably employed to provide unbroken decking.

The adhesive (33) between the substrate and wood strips is a bedding adhesive selected to securely bond the impregnated wood (34) to the substrate (31). The adhesive (35) may have the same or different composition to the adhesive (33) and is selected to be flexible after curing to accommodate expansion or shrinkage of the wood during use.

The wooden strips are selected so that the annual rings (40) of the strips have an angle (39) to the working surface (36) of the decking. Conventional wood which has not been treated usually has an angle (39) between 60° and 90° selected, to minimize horizontal movement due to swelling and shrinkage. If the annual rings are generally vertical (eg between 60° and 90°) the main direction of swelling is vertical (tangentially to the annual ring direction). When using treated wood of the present invention the angle (39) may be selected to any convenient value and is less critical than if untreated wood is used. This allows more economical utilisation of timber resources.

Decking in accordance with this invention does not swell to the same extent as untreated maple. Swelling properties of treated maple in accordance with this invention is similar to teak.

The physical properties of decking in accordance with this invention were determined as described in the following examples:

Example 1

Durability Against Rot

The table below presents results from laboratory tests according to the American soil block method, E-10 (AWPA), for four different fungi and two different treatment levels of furfuryl alcohol. For all fungi the highest treatment level gives mass losses below 15% of the control losses, which corresponds to a high durability.

| | | E10 on Maple | | | | | |
|---|---|---|---|---|---|---|---|
| | | Retention | | Mean corrected Mass loss (%) | | Durability | |
| Test fungus | Treating solution | (WPG) | (kg/m³) | Invention | Control | x-value | Class |
| Coniophora puteana | 28% furfuryl alcohol in solution | 22 | 144 | 5.4 | 30.3 | 0.18 | 2 |
| Poria placenta | | 22 | 144 | 17.4 | 47.5 | 0.37 | 3 |
| Irpex lacteus | | 22 | 144 | 12.4 | 38.8 | 0.32 | 3 |
| Coriolus versicolor | | 22 | 144 | 8.7 | 31.5 | 0.28 | 2 |
| Coniophora puteana | 40% furfuryl alcohol | 31 | 209 | 2.5 | 29.2 | 0.09 | 1 |
| Poria placenta | | 31 | 209 | 6.6 | 48.0 | 0.14 | 1 |
| Irpex lacteus | | 31 | 209 | 4.6 | 40.4 | 0.11 | 1 |
| Coriolus versicolor | | 31 | 209 | 1.0 | 33.5 | 0.03 | 1 |

Example 2

Adhesion Strength

The glue-lines between the impregnated wood and polyester substrate were tested using the European test method EN 314-2. This method is intended for tests for gluing quality of plywood. Before the tests the specimens were divided into three groups pre-treated in three different ways:
1. Conditioning in an atmosphere of 20° C. and 65% relative air humidity.
2. Immersion for 72 hours in boiling water
3. V313-test according to EN 321. The specimens were submitted to a cyclic ageing of 3 days in water 20° C., 1 day in a freezer (−12° C.) and 3 days in a heating cabinet 70° C. The cycle was repeated three times.

After the pre-treatment the specimens were tested in tension shear with a constant rate of deformation. The speed was adjusted to get failure at 60±30 sec. The maximum load for each specimen was recorded.

Figure 4:
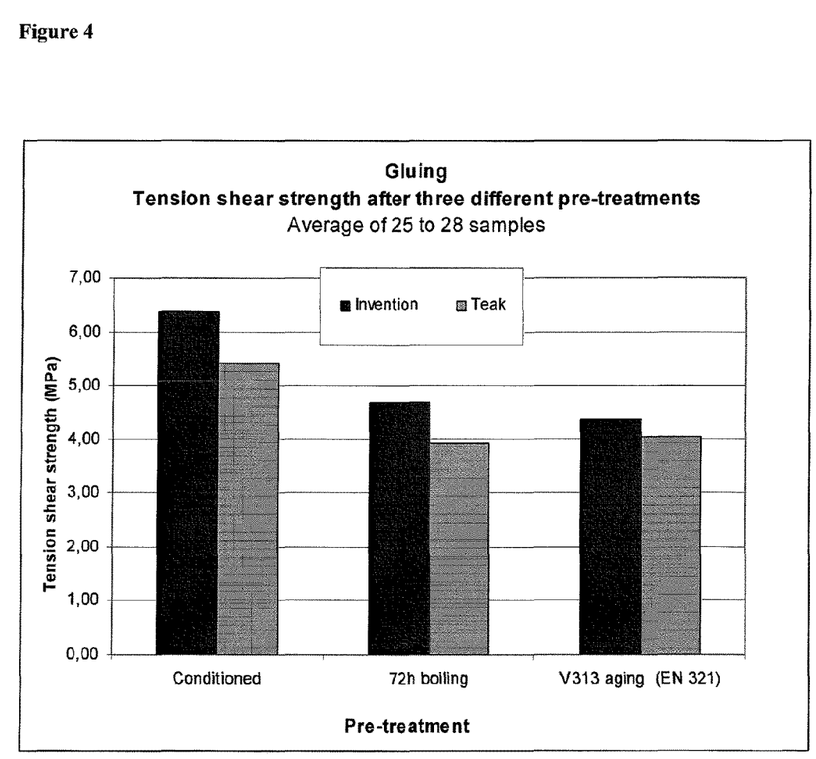
FIGS. 4 to 6 illustrate test results showing physical properties of the decking.

FIG. 4 shows the results from tension shear tests of the glue-lines between impregnated wood and polyester. The mean values from 20 specimens were used.

The percentage of wood failures in the specimens was very high, independent of the species or pre-treatment. All results from the tests are presented in FIG. 4.

The sealant between the strips was tested with tension tests. The specimens were made from three ribs glued together with the adhesive sealant. This means that two joints were tested at the same time and the failure load represented the weaker of two glue lines. Also the stress represented the total stress from two joints and thus a conservative estimation of the ultimate stress. Since the tests are comparative between teak which have been proved to work in practice and impregnated Maple this was acceptable.

Before the testing the specimens were submitted to three different pre-treatments:
1. Conditioning in a climate of 20° C. and 65% relative air humidity.
2. Immersion for 2 hours in boiling water
3. Immersion for 72 hours in boiling water Immersion for 72 hours in boiling water is a pre-treatment for determination of bonding strength for exterior plywood. Immersion for 2 hours in boiling water was selected based on pilot trials since there was a risk of total loss of strength of the sealant after 72 hours in boiling water.

Figure 5:
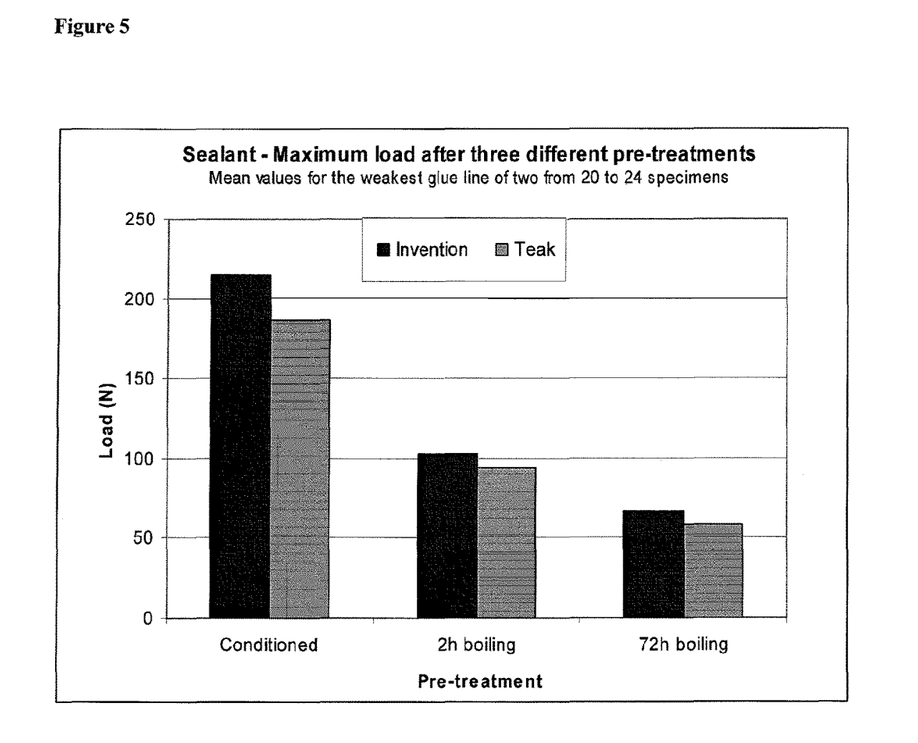
Figure 6:
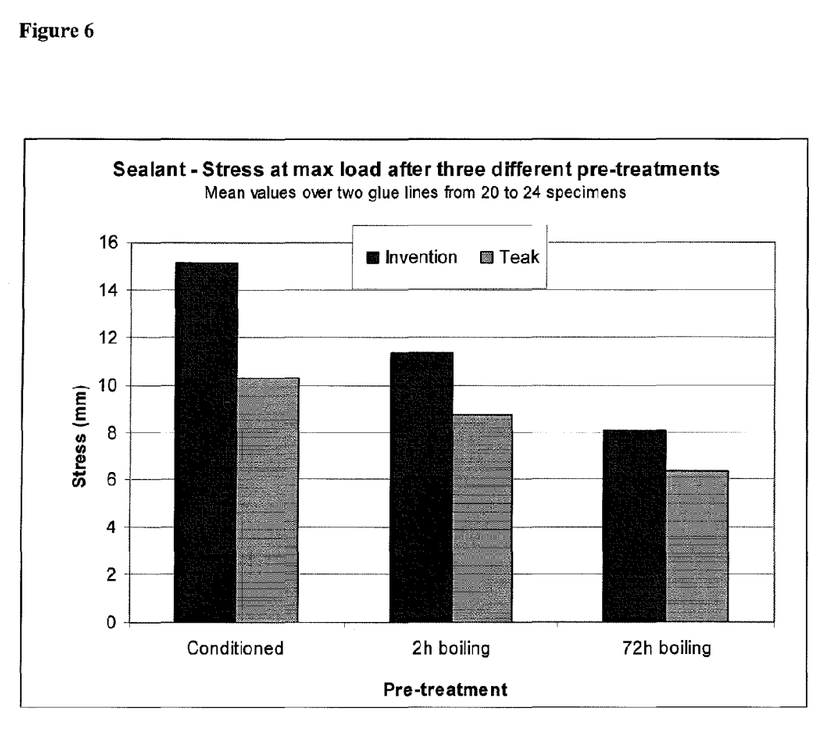

The results are shown in FIGS. 5 and 6.

What is claimed is:

1. Marine decking comprising:
   a support selected from the group consisting of polymeric materials; marine engineering polymers, fibre reinforced polymers, polymer metal composites, metal or wood sheets or marine superstructure; and
   an array of strips of polymer treated wood secured to the support by an adhesive, the array of strips forming an upper surface opposite the support,
   wherein the polymer treated wood includes a maple species impregnated with a polymer selected from the group consisting of furfuryl alcohol, bis hydroxymethyl furan, and mixtures thereof, and
   wherein the strips of polymer treated wood are oriented such that annual rings of at least some of the strips form a non-vertical angle with the upper surface.

2. The marine decking as claimed in claim 1 wherein the polymer treated wood has a hardness value of 3 to 8 on the Brinell scale.

3. The marine decking as claimed in claim 1, wherein the polymer treated wood has a bending modulus of rupture of between 100 and 130 MPa.

4. The marine decking as claimed in claim 1 wherein the wood surface exhibits a hardness of 4 to 7 on the Brinell scale.

5. The marine decking as claimed in claim 1 wherein a wood surface of the polymer treated wood exhibits a hardness of 5 to 6 on the Brinell scale.

6. The marine decking as claimed in claim 1 wherein the support further comprises a substrate selected from polyester sheeting, glass fibre, reinforced polyester, epoxy-wood composites, plywood, polyaramid sheet, carbon fibre composites or laminates, and solid wood or metal sheets.

7. The marine decking as claimed in claim 1 wherein the adhesive is selected from the group consisting of polyurethane adhesives, modified silyl polymer adhesives and epoxy resin adhesives.

8. The marine decking as claimed in claim 1 wherein the maple species is selected from *Acer macrophyllum; Acer negundo; Acer nigrum; Acer rubrum; Acer saccharinum; Acer saccharum; Acer pseudoplatinus; Acer platanoides; Acer campestre.*

9. The marine decking as claimed in claim 1 wherein edges of the strips include rebates.

10. The marine decking as claimed in claim 1 wherein a volumetric swelling of the polymer treated wood is 8 to 10% from oven dry to moisture saturated.

11. The marine decking as claimed in claim 1, the polymer treated wood having a modulus of elasticity between 10000 and 17000 MPa.

12. The marine decking as claimed in claim 1, the polymer treated wood having a density of 700 to 1000 kg·m$^{-3}$.

13. A process for manufacture of marine decking as claimed in claim 1 comprising the steps of
   assembling a laminate comprising an array of the strips of polymer treated wood consisting of a maple species impregnated with a furfuryl alcohol polymer, the polymer being selected from the group consisting of furfuryl alcohol, bis hydromethyl furan, and mixtures thereof;
   securing the polymer treated wood to a sheet of polymeric material selected from the group consisting of marine engineering polymers, fibre reinforced polymers, polymer metal composites, metal or wood sheets, or superstructure by an adhesive selected from the group consisting of: polyurethane adhesives, modified silyl polymer adhesives, and epoxy resin adhesives; and
   applying pressure to the assembly and allowing the adhesive to cure.

14. The decking as claimed in claim 1, wherein the non-vertical angle is less than about 60 degrees.

15. A process for manufacture of a marine decking, the process comprising the steps of
   impregnating wooden strips including a maple species with a polymerizable composition comprising:
   (i) a polymer selected from the group consisting of furfuryl alcohol, bishydroxymethyl furan, and mixtures thereof;
   (ii) a catalyst;
   (iii) a solvent selected from the group consisting of water, $C_1$-$C_4$ alcohols, and mixtures thereof; and
   (iv) optionally one or more stabilisers or other ingredients;
   to produce impregnated decking strips;
   following impregnation, subjecting the impregnated decking strips to a water removal process comprising maintaining the impregnated decking strips in an atmosphere having a pressure of 10 kPa (0.1) to 50 kPa (0.5 bar), at a first temperature of 50 to 90° C., for a duration sufficient to cause removal of water from the impregnated decking strips; and
   following the water removal process, maintaining the impregnated decking strips at a second temperature higher than the first temperature to cure the polymerizable composition and form polymer treated decking strips.

16. The process as claimed in claim 15 wherein the polymerizable composition comprises 20 to 95 parts furfuryl alcohol, to 100 parts water.

17. The process as claimed in claim 15, wherein the polymerizable composition comprises about 70 to 100 parts polymer to about 100 parts solvent by volume.

18. The process as claimed in claim 15, further comprising:
- securing the polymer treated decking strips to a sheet of polymeric material selected from the group consisting of marine engineering polymers, fibre reinforced polymers, polymer metal composites, metal or wood sheets, and marine superstructure,
- by an adhesive selected from the group consisting of polyurethane adhesives, modified silyl polymer adhesives, and epoxy resin adhesives; and
- applying pressure to the polymer treated decking strips, sheet of polymeric material, and adhesive and allowing the adhesive to cure.

19. A process for the manufacture of a marine decking, the process comprising the steps of:
- impregnating wooden strips including a maple species with a polymerizable composition, the polymerizable composition including:
  - a polymer selected from the group consisting of furfuryl alcohol, bishydroxymethyl furan, and mixtures thereof;
  - a catalyst selected from the group consisting of maleic acid, malic acid, phthalic acid, benzoic acid, citric acid, organic anhydride, aluminum chloride, ammonium salt, and combinations thereof; and
  - a solvent selected from the group consisting of water, $C_1$-$C_4$ alcohols, and mixtures thereof;
- to produce impregnated decking strips;
- following impregnation, drying the impregnated decking strips at a first temperature for a duration sufficient to cause removal of water from the impregnated decking strips; and
- following the drying process, curing the polymerizable composition by heating the impregnated decking strips to a second temperature higher than the first temperature to form polymer treated decking strips.

20. The process of claim 19, wherein the first temperature is about 50 to 90° C. and the second temperature is about 90 to 140° C.

* * * * *